United States Patent
Koh et al.

(10) Patent No.: US 7,523,023 B1
(45) Date of Patent: Apr. 21, 2009

(54) AUTOMATIC GENERATION OF COMPONENT INTERFACES FOR COMPUTATIONAL HARDWARE IMPLEMENTATIONS GENERATED FROM A BLOCK DIAGRAM MODEL

(75) Inventors: David Koh, Boston, MA (US); Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 844 days.

(21) Appl. No.: 11/021,760

(22) Filed: Dec. 23, 2004

Related U.S. Application Data

(60) Provisional application No. 60/611,615, filed on Sep. 20, 2004.

(51) Int. Cl.
  *G06F 17/50* (2006.01)
  *G06F 3/023* (2006.01)
(52) U.S. Cl. .............................. 703/2; 703/22; 717/120; 717/156
(58) Field of Classification Search ................... 703/22, 703/2; 717/156, 120; 713/151; 707/102
See application file for complete search history.

(56) References Cited

U.S. PATENT DOCUMENTS

| | | | |
|---|---|---|---|
| 2003/0018888 A1* | 1/2003 | Ara et al. ..................... | 713/151 |
| 2005/0107998 A1* | 5/2005 | McLernon et al. ............ | 703/22 |
| 2006/0106861 A1* | 5/2006 | Torgerson et al. ........... | 707/102 |

* cited by examiner

*Primary Examiner*—Thai Phan
(74) *Attorney, Agent, or Firm*—Lahive & Cockfield, LLP; Kevin J. Canning

(57) ABSTRACT

Method and systems are provided for representing interfaces between electronic components of a computational hardware device in a graphical model and automatically generating code from the graphical model to implement one or more component interfaces in the computational hardware device. A graphical modeling environment provides for the definition of interface boundaries to represent component interfaces between electronic components associated with partitions of a graphical model design. A code building tool automatically generates code from the graphical model to build executable instructions to run the component interfaces on the electronic components of the computational hardware device.

68 Claims, 5 Drawing Sheets

AUTOMATIC GENERATION OF COMPONENT INTERFACES FOR COMPUTATIONAL HARDWARE IMPLEMENTATIONS GENERATED FROM A BLOCK DIAGRAM MODEL

RELATED APPLICATIONS

This present application claims priority to U.S. Provisional Patent Application No. 60/611,615, entitled "Automatic Generation Of Component Interfaces For Heterogeneous Implementations Generated From A Block Diagram Model", filed Sep. 20, 2004, which is incorporated herein by reference.

TECHNICAL FIELD

The present invention generally relates to technical computing, and, more particularly, to automatically generating code for interfaces between components of a computational hardware device from a design in a block diagram model.

BACKGROUND INFORMATION

Graphical modeling environments, such as the technical computing environment of MATLAB® from the MathWorks, Inc. of Natick, Mass., can provide a "model-based design" approach to designing an implementation, such as for embedded computational hardware. The term "model-based design" is used to refer to a graphical model acting as a design. A model-based design may be used as a design specification for an implementation, such as an implementation of an algorithm in hardware circuitry or the implementation of code to run on a microprocessor. A graphical block diagram modeling environment can produce designs in block diagram form to specify computations that can be performed on computational hardware such as a general purpose processor, microcontroller, DSP, FPGA, PLD, or ASIC.

As a design specification, a model-based design can drive the building process of an implementation of the design. For instance, the model-based design can act as a specification from which to automatically generate code from a block diagram model. For a design that represents a computation to perform on a single component, such as a processor, the code implementation of the design can be relatively straightforward. However, a block diagram model may represent a design for implementation on a computational hardware device that may comprise a multiple component heterogeneous topology, for example, an embedded control system with multiple different microprocessors and FPGAs. In another case, a block diagram model design which may be implemented in code to run on a single processor, instead may be targeted to run on a multiple component computational hardware for a variety of design reasons, such as quality, cost, speed, size, etc. In these types of cases, it is much more challenging and difficult to generate an implementation, such as generating code, from a model-based design as the implementation is dependent on the topology of the hardware. Multiple component computational hardware can be designed with various topologies, and can have multiple processors with multiple integrated circuit (ICs) devices, such as FPGAs, PLDs and ASICs. Additionally, the computational hardware may comprise a heterogeneous topology consisting of different types of processors and IC components.

Moreover, with the wide range of possible combinations of processor and IC components that can be designed into hardware, implementation of a model-based design is further complicated as these components can also be interfaced together by a wide range of different types of physical, communication and control interfaces. For example, the hardware may include various physical communication interfaces between components such as a serial I/O connection, parallel I/O connection, shared memory, or a FIFO queued buffer. The physical communication interfaces may require custom or specific device drivers to support communicating via the physical medium. The components can communicate over the physical communication interface to exchange data, and to control and coordinate the performance of portions of the computations across different components, or to otherwise perform inter-process communications. As such, the implementation of a design into code is further dependent on the type of physical interfaces and device drivers, type of communication and control interfaces, and the algorithms for inter-process communications.

A block diagram modeling environment, such as Simulink® from The MathWorks, Inc. of Natick, Mass., may provide block diagram models for representing a design, such as computations, algorithms and functionality that may be implemented on a target device such as a microprocessor, an embedded control system, or custom designed board. That is, the design is modeled and simulated in the block diagram modeling environment to determine and test system behavior before implementing the design physically in a target hardware device. Once the design is determined to be ready for implementation on a target device, code may automatically be generated from the block diagram model to execute on a processor of the target device. The block diagram model may represent a design that may be implemented on different types of target devices depending on various hardware design choices such as performance and cost. However, the block diagram modeling environment does not provide a model-based design approach to generating component interfaces between electronic components of a target device. Typically, implementing code for component interfaces is done manually. A model-based design approach would need to take into consideration the various types and combinations of component interfaces available in target devices, changes to the topology of a target device under design by the model, and changes in the selection of the target device. For example, in one target device there may be a processor to processor interface using shared memory and in another target device there may be a processor to IC interface using a FIFO. There may be any combination of processor-to-processor, IC-to-IC, processor-to-IC, and IC-to-processor interfaces to implement for a target device. If the topology of the target device changes, then the manually coded component interfaces would need to be manually re-implemented. As a result, the model-based design of a graphical model such as a block diagram model does not drive the process of building component interfaces and does not take into account the heterogeneous topology of multiple target devices having multiple components.

Thus, it is desirable to represent in a graphical model component interfaces between electronic components associated with a design that may be implemented in one or more target devices. Systems and methods are desired to automatically generate code from a graphical design model for the implementation of the component interfaces between electronic components of the target device.

SUMMARY OF THE INVENTION

The present invention provides systems and methods to represent in a graphical model an interface between electronic components of a target computational hardware device and to automatically generate code from the graphical model to implement the component interface on the target device. A graphical modeling environment provides for a graphical model design that can be targeted for implementation on one or more computational hardware devices, such as an embedded hardware processing platform. The graphical modeling environment provides for the partitioning of the design to associate each partition with an electronic component of the target device. That is, the graphical model provides mechanisms for the model to be partitioned so that portions of the design may be associated with and represent electronic components of the device targeted for the implementation of the design.

Furthermore, the graphical modeling environment provides for identifying an interface boundary in the graphical model to represent a component interface between electronic components associated with the partitions in the graphical model. That is, the interface boundary represents a component interface to be implemented between electronic components in a target device. The graphical modeling environment provides for the configuration of the component interface associated with an interface boundary to provide information describing the physical, communication and control interfaces between the electronic components. As such, a graphical model can be produced representing a model-based design of component interfaces and therefore, act as an implementation specification for generating component interface code from the design. Additionally, a code building tool having a code generator can automatically generate code from the graphical model to build programs targeted to run on the electronic components. The code generator implements in the code the component interfaces represented by the model-based design of the graphical model. In summary, the present invention provides for the automatic code generation of component interfaces for electronic components from a component interface representation in a model-based design of a graphical model.

In one aspect, the present invention provides a method for representing in a graphical model an interface between electronic components. The method comprises the steps of providing, in a modeling environment, a graphical model representing a design that may be implemented in a first computational hardware device having at least a first electronic component and a second electronic component. The method includes the step of identifying an interface point between a first part of the graphical model representing a portion of the design associated with the first electronic component and a second part of the graphical model representing a portion of the design associated with the second electronic component. The method graphically represents via an interface indicator at the interface point a component interface between the first electronic component and the second electronic component. The interface indicator can represent at least one type of component interface of one or more component interface types.

In one aspect of the present invention, the method includes comprising identifying a component interface type from one or more component interface types to associate with the interface indicator without changing the graphical representation of the graphical model or the interface indicator. In another aspect, the method comprises associating a component interface type from one or more component interface types with the interface indicator while maintaining the graphical representation of one of the graphical model and the interface indicator.

Additionally, the method of the present invention includes associating the interface indicator with one component interface type of one or more component interfaces between electronic components different than one of the first electronic component and the second electronic component, while maintaining the graphical representation of the interface indicator. Furthermore, the design of the graphical model can be implemented on a second computational hardware device without changing the graphical representation of one of the graphical model and the interface indicator. The second computational hardware device may have one or more different component interfaces than the first computational hardware device. Also, the design of the graphical model can be implemented in a second computational hardware device without changing the graphical representation of the graphical model or the interface indicator. The second computational hardware device may have the same electronic components as the first computational hardware device or electronic components different than the first computational hardware device.

In a further aspect of the present invention, the method graphically represents via a plurality of interface indicators a plurality of component interfaces between electronic components represented by parts of the graphical model. Any of the components of the computational hardware device may be any type of integrated circuit such as a processor, ASIC, FPGA, or PLD.

In an additional aspect of the present invention, the interface indicator in the graphical model represents a first portion of code to be generated suitable for implementation on the first electronic component and/or a second portion of code to be generated suitable for implementation on the second electronic component. The first portion of code and the second portion of code provide the implementation of the component interface between the first electronic component and the second electronic component. The method may also comprise configuring, in the modeling environment, a type of the first component interface. The component type may be obtained from one or more of the following: 1) one or more component interface types listed with the modeling environment, 2) a topology of one or more computational hardware devices listed with the modeling environment, 3) a library of one or more component interfaces readable by the modeling environment, and 4) a reference configured in the modeling environment to a user provided component interface.

In another aspect, the present invention relates to a device readable medium comprising device readable instructions to execute the steps of the method, as described above, related to representing a component interface in a graphical model.

In a further aspect, the present invention relates to transmitting via a transmission medium computer data signals representing device readable instructions to execute the steps of the method, as described above, related to representing a component interface in a graphical model.

In one aspect, the present invention provides a method for generating code from a graphical model for an interface between electronic components of a computational hardware device. The method comprises the step of receiving a graphical model having an interface indicator that represents a component interface between a first electronic component and a second electronic component of the computational hardware device. A first part of the graphical model represents a portion of a design to be implemented in the first electronic component, and a second part of the graphical model represents a portion of a design to be implemented in a second electronic component. The method also generates a first set of code for the first part that includes a first portion of the component interface to execute on the first component, and a second set of code for the second part that includes a second portion of the component interface to execute on the second component.

In another aspect of the present invention, the first set of code has code representative of a portion of the functionality represented by the first part, and the second set of code has code representative of a portion of the functionality represented by the second part of the graphical model. Additionally, one of the first portion of code and the second portion of code may have code determined by a type of component interface. The type of component information may be obtained from the graphical model. In a further aspect, any of the electronic components, such as the first and second electronic components may be any type of integrated circuit such as a processor, FPGA, ASIC, or PLD.

In an additional aspect, the method of the present invention comprises the step of invoking a building of the first set of code and the second set of code into programs to execute on the first and second electronic components. The method may also generate a portion of the component interface by linking in a device driver.

In yet another aspect, the present invention relates to a device readable medium a having device readable instructions to execute the steps of the method, as described above, related to generating code from a graphical model for a component interface in a computational hardware device.

In a further another aspect, the present invention relates to transmitting via a transmission medium computer data signals representing device readable instructions to execute the steps of the method, as described above, related to generating code from a graphical model for a component interface in a computational hardware device.

In one aspect, the present invention provides a method for representing a component interface in a graphical model and generating code for the component interface from the graphical model. The method comprises the steps of providing, in a modeling environment, a graphical model representing a design that may be implemented in a first computational hardware device having at least a first and a second electronic component. A first part of the graphical model represents a portion of the design that may be implemented in the first electronic component. A second part of the graphical model represents a portion of the design that may be implemented in the second electronic component. The method provides the step of graphical representing via an interface indicator between the first part and second part of the graphical model a component interface to be implemented between the first electronic component associated with the first part and the second electronic component associated with the second part. The method then generates code from the graphical model to implement the first component interface between the first component and the second component.

In another aspect of the present invention, the method generates a first set of code for the first part of the graphical model that includes a first portion of the component interface to execute on the first electronic component. The method may also generate a second set of code for the second part of the graphical model that includes a second portion of the component interface to execute on the second electronic component. In another aspect, the method invokes a building of the first set of code and the second set of code into programs to execute on the first and second electronic components. The method may also generate a portion of the component interface between the first component and the second component by linking in a device driver.

Furthermore, the method of the present invention includes associating the interface indicator with one component interface type of one or more component interfaces between electronic components different than either the first electronic component or the second electronic component, while maintaining the graphical representation of the interface indicator. Additionally, the design of the graphical model can be implemented on a second computational hardware device without changing the graphical representation of the graphical model and/or the interface indicator. The second computational hardware device may have one or more different component interfaces than the first computational hardware device. Also, the design of the graphical model can be implemented in a second computational hardware device without changing the graphical representation of the graphical model and/or the interface indicator, and the second computational hardware device may have the same or different electronic components as the first computational hardware device. Furthermore, any of the components of the first and second computational hardware device may be any type of integrated circuit.

In a further aspect, the method of the present invention may also configure, in the modeling environment, a type of the component interface. The type of the component interface may be obtained from one or more of the following: 1) one or more component interface types listed with the graphical modeling environment, 2) a topology of one or more computational hardware devices listed with the graphical modeling environment, 3) a library of one or more component interfaces readable by the graphical modeling environment, and 4) a reference configured in the graphical modeling environment to a user provided component interface.

In yet another aspect, the present invention relates to a device readable medium having device readable instructions to execute the steps of the method, as described above, related to a method for representing a component interface in a graphical model and generating code for the component interface from the graphical model.

In an additional aspect, the present invention also relates to transmitting via a transmission medium computer data signals representing device readable instructions to execute the steps of the method, as described above, related to a method for representing a component interface in a graphical model and generating code for the component interface from the graphical model.

In one aspect, the present invention relates to a system for representing a component interface in a graphical model and generating code for the component interface from the graphical model. The system comprises a graphical modeling environment and a code generator. The graphical modeling environment provides a graphical model having representing a design that may be implemented in a first computational hardware device. The computational hardware device may have multiple electronic components, such as a first and a second electronic component. A first part of the graphical model represents a portion of the design that may be implemented in the first electronic component, and a second part of the graphical model represents a portion of the design that may be implemented in the second electronic component. A configuration mechanism in communications with the graphical modeling environment is used to graphically represent via an interface indicator between the first part and the second part of the graphical model a first component interface between the first electronic component associated with the first part and the second electronic component associated with the second part. The code generator receives the graphical model, and generates code for the component interface between the first and second electronic component. In a further aspect, the graphical modeling environment and the code generator may be distributed and either may execute on a first or a second computing device.

In another aspect of the present invention, the code generator generates a first set of code representing a first portion of the implementation of the component interface. The code generator may also generate a second set of code representing a second portion of the implementation of the component interface. The code generator may also invoke a building of the first and second set of code into programs to execute on the first and second electronic components. Additionally, the code generator may obtain a portion of the implementation of the first component interface by linking in a device driver.

In an additional aspect, the configuration mechanism of the present invention provides a user interface to define a type of the first component interface. The configuration mechanism may obtain a type of the component interface from the graphical modeling environment via one or more of the following: 1) one or more component interface types listed with the graphical modeling environment, 2) a topology of one or more computational hardware devices listed with the graphical modeling environment, 3) a library of one or more component interfaces readable by the graphical modeling environment, and 4) a reference configured in the graphical modeling environment to a user provided component interface.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for representing in a block diagram model a component interface between electronic components of a target computational hardware device. The system and methods also provide for automatically generating code from the block diagram model to implement the component interfaces between the electronic components and to build code to run on the electronic components. In a graphical modeling environment, block diagram models can be produced to represent a design for the implementation of code on a computational hardware device having multiple electronic components. One or more blocks of the block diagram model can be selected as a first partition of the model, and one or more other blocks of the block diagram model can be selected as a second partition of the model. Each of the partitions represents a portion of the design that may be implemented on one or more electronic components of the computational hardware device. Moreover, the graphical modeling environment provides a configuration mechanism to identify interface boundaries and to configure interfaces between the electronic components of the computational hardware device, such as communication and control interfaces, in the block diagram model. A code building tool is used to generate code from the block diagram model based on the design represented by the block diagram model. The code building tool generates code to implement the component interfaces defined in the block diagram model and generates code to run on each of the electronic components.

The illustrative embodiment will be described solely for illustrative purposes relative to the technical computing environment of MATLAB® and Simulink® from The MathWorks, Inc. of Natick, Mass. Although the illustrative embodiment will be described relative to a MathWorks-based application, one of ordinary skill in the art will appreciate that the present invention may be applied to other graphical modeling environments and technical computing environments, such as any environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1A:
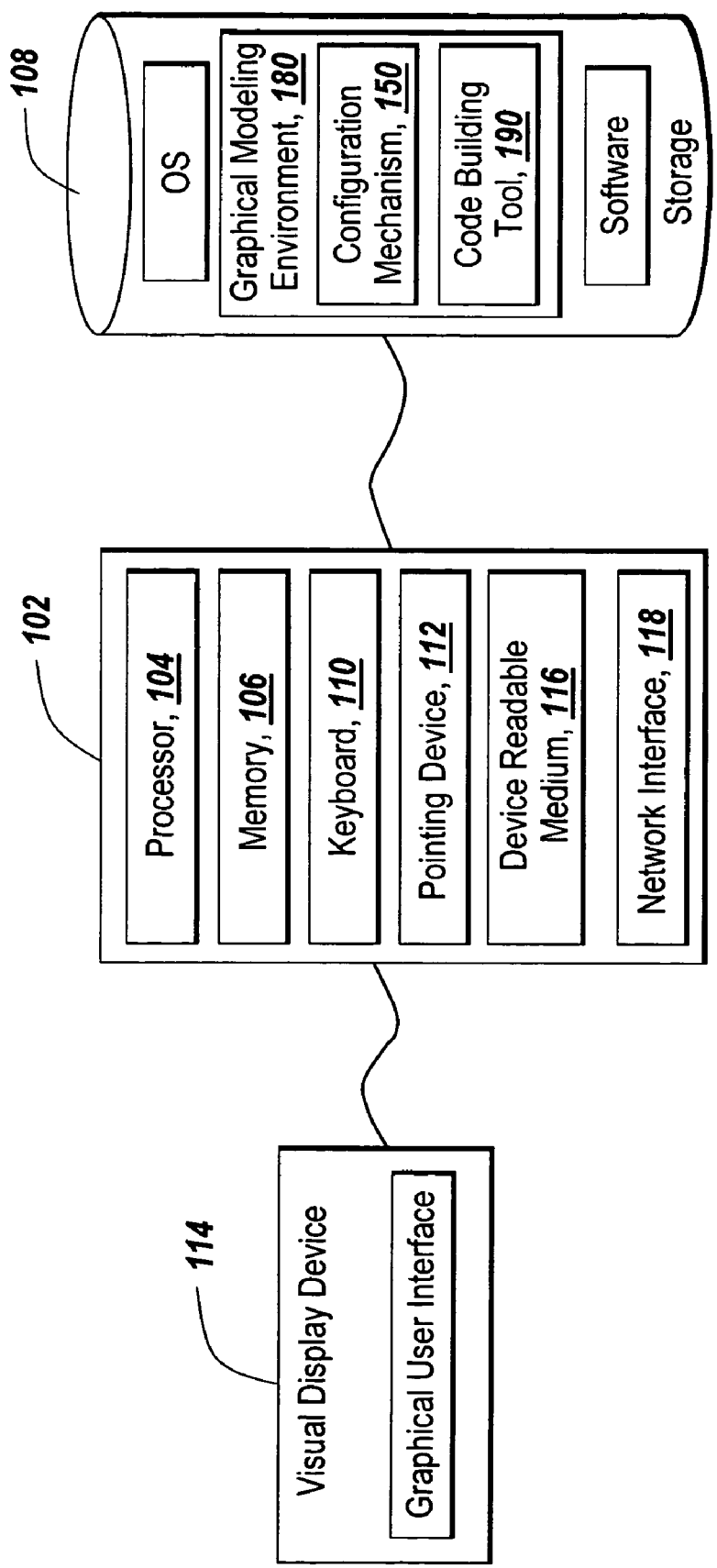
FIG. 1A is a block diagram of a computing device for practicing an illustrative embodiment of the present invention.

FIG. 1A depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may be used to display a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. For installing software programs, the computing device 102 may support any suitable device readable medium 116, such as a CD-ROM, DVD-ROM floppy disks, tape device, USB device, hard-drive or any other suitable device. The computing device 102 may further comprise a storage device 108, such as a hard-drive or CD-ROM, for storing an operating system and other related software. The present invention of a graphical modeling environment 180 may comprise software that is installed via a device readable medium 116 and stored in the storage device 108. Additionally, the operating system and graphical modeling environment 180 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The present invention provides a technical computing environment comprising a graphical modeling environment 180. In brief overview, the graphical modeling environment 180 is a platform for multi-domain simulation and model-based design of dynamic systems, algorithms, computations, implementations of software and/or hardware, and any other naturally occurring or man-made system. In the graphical modeling environment 180, customizable functional blocks are used to create block diagram models that may represent one or more computations that can be performed on a computational hardware device, such as a computer, embedded system, processor or integrated circuit. The graphical modeling environment 180 comprises a graphical user interface for interactively creating and working with block diagram models and may also provide for simulating, testing and verifying block diagram models. Furthermore, the graphical modeling environment 180 may comprise a configuration mechanism 150 for configuring any elements and properties of or associated with the block diagram model and/or the graphical modeling environment 180. The configuration mechanism 150 may comprise any type of user interface, such as a graphical user interface. As such, it may comprise any conventional user interface mechanisms such as menu items, forms, toolbars, etc. to provide a user interface to receive user input with regards to configuration.

In an exemplary embodiment, the graphical modeling environment 180, such as a graphical modeling environment like Simulink® from the MathWorks, Inc. of Natick, Mass., provides a graphical and interactive environment by which engineers and other designers can use a model-based design approach to design and develop code for a computational hardware device. With a model-based design approach, the graphical modeling environment 180 allows a block diagram model to be an implementation specification for automatically generating code. As such, design changes to the model can be quickly updated in the design model, evaluated by simulation and then automatically reflected in the generated code.

The graphical modeling environment 180 also comprises a code building tool 190 to generate code for the implementation of the design represented by a block diagram model. In brief overview, the code building tool 190, such as a code building tool like Real-Time Workshop® from the MathWorks, Inc. of Natick, Mass., generates and executes stand-alone source code, such as with a C programming language, for models created with the graphical modeling environment 180, such as a graphical modeling environment 180 provided by Simulink®. The code building tool 190 can generate source code for the model or for subsystems of the model, compile the source code into object code and build an executable program. The code may be designed to run on any processor, microprocessor, operating system, computational hardware device or component of a computational hardware device. Additionally, the code may be customized to run on a specific target hardware platform.

The graphical modeling environment 180 can be an application, module, service, software component or any other type of computer program which is designed to and capable of executing the functionality supported by the technical computing environment as described herein. Furthermore, the code building tool 190 may be separated from the graphical modeling environment 180 and may comprise an application, module, service, software component or any other type of computer program. Additionally, the graphical modeling environment 180 may be configured to and capable of running any of the modules, libraries or software components of the MATLAB® product family. As such, the graphical modeling environment 180 may have all or a portion of the software components of MATLAB® installed on the computing device 102, or alternatively, accessible from another computing device 102' on a network.

Figure 1B:
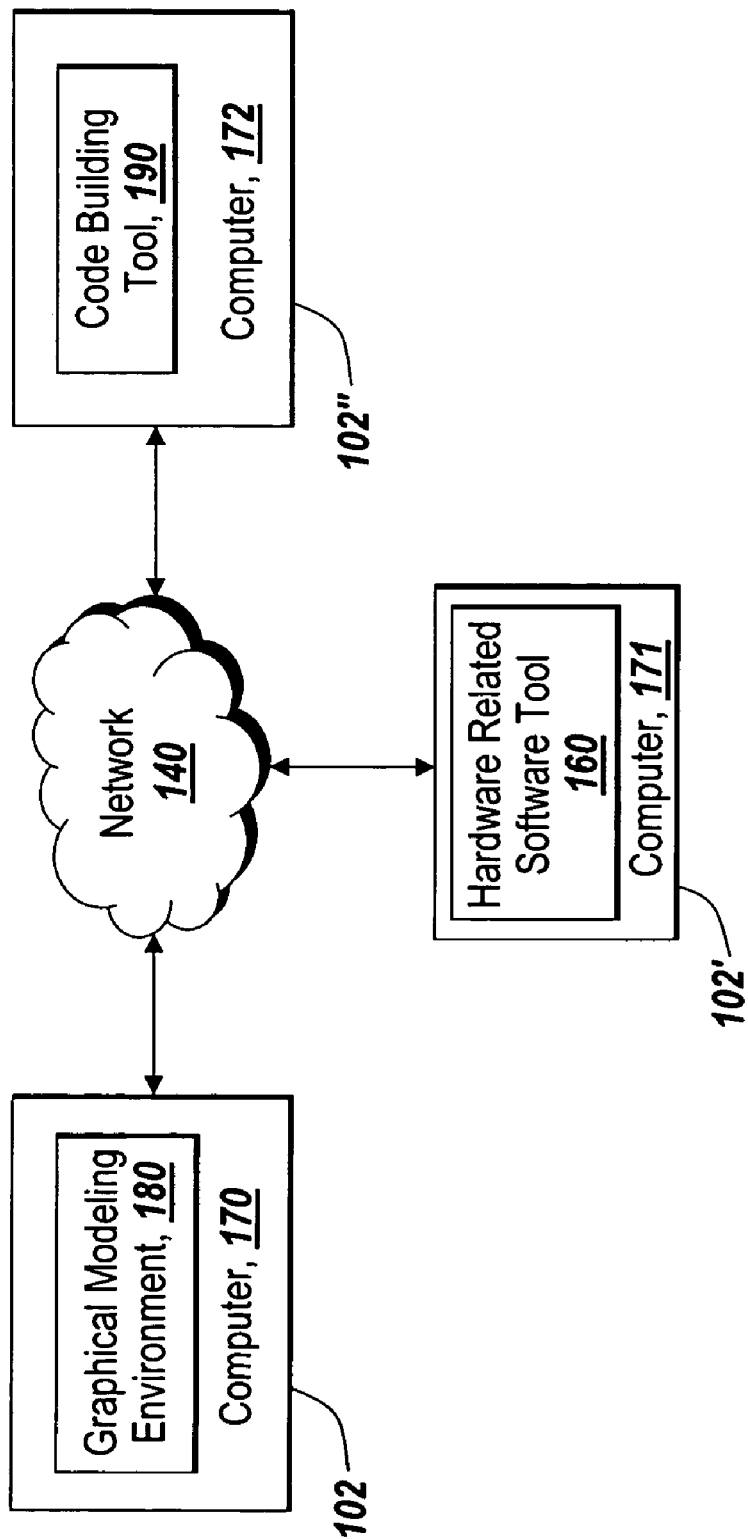
FIG. 1B is a block diagram of computing devices on a network for practicing another illustrative embodiment of the present invention.

FIG. 1B depicts another environment suitable for practicing an illustrative embodiment of the present invention, where the graphical modeling environment 180 and the code building tool 190 is deployed in a networked computer system 100. In a broad overview, the networked system 100 depicts a multiple node network 140 for running in a distributed manner the graphical modeling environment 180 and the code building tool 190 of the present invention. The system 100 includes multiple computers 170-172 connected to and communicating over a network 140. The network 140 can be a local area network (LAN), such as a company Intranet, a metropolitan area network (MAN), or a wide area network (WAN) such as the Internet. In one embodiment (not shown), the network 140 comprises separate networks, which may be of the same type or may be of different types. The topology of the network 140 over which the computers 170-172 communicate may be a bus, star, or ring network topology. The network 140 and network topology may be of any such network 140 or network topology capable of supporting the operations of the present invention described herein.

The computers 170-172 can connect to the network 140 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., .TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections). The network connection and communication protocol may be of any such network connection or communication protocol capable of supporting the operations of the present invention described herein.

In the network 140, each of the computers 170-172 are configured to and capable of running at least a portion of the present invention. As a distributed application, the present invention may have one or more software components that run on each of the computers 170-172 and work in communication and in collaboration with each other to meet the functionality of the overall application as described herein. Each of the computers 170-172 can be any type of computing device 102, 102', and 102" as described above and respectively configured to be capable of computing and communicating the operations described herein. For example, any and each of the computers 170-172 may be a server, a multi-user server, server farm or multi-processor server. In another example, any of the computers 170-172 may be a mobile computing device such as a notebook or PDA. One ordinarily skilled in the art will recognize the wide range of possible combinations of types of computing devices capable of communicating over a network.

The network 140 and network connections may include any transmission medium between any of the computers 170-172, such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102, such as computers 170-172, to practice the present invention.

Each of the computers 170-172 may be configured to and capable of running the graphical modeling environment 180 and/or the code building tool 190. The graphical modeling environment 180 and the code building tool 190 may run together on the same computer 170, or may run separately on different computers 170 and 172. Furthermore, the graphical modeling environment 180 and/or the code building tool 190 can be capable of and configured to operate on the operating system that may be running on any of the computers 170 and 172 (e.g., computing devices 102 and 102"). Each computer 170-172 can be running the same or different operating systems. For example, computer 170 can be running Microsoft® Windows, and computer 171 can be running a version of UNIX, and computer 172, a version of Linux. Or each computer 170-172 can be running the same operating system, such as Microsoft® Windows. Additionally, the graphical modeling environment 180 and code building tool 190 can be capable of and configured to operate on and take advantage of different processors of any of the computing device. For example, the graphical modeling environment 180 can run on a 32 bit processor of one computing device 102 and a 64 bit processor of another computing device 102'. Furthermore, the graphical modeling environment 180 and/or code building tool 190 can operate on computing devices that can be running on different processor architectures in addition to different operating systems. One ordinarily skilled in the art will recognize the various combinations of operating systems and processors that can be running on any of the computing devices. In summary, the graphical modeling environment 180 and code building tool 190 may be deployed across a wide range of different computing devices, different operating systems and different processors in various network topologies and configurations. One ordinarily skilled in the art will appreciate the various ways the present invention may be practiced in a distributed manner in a networked system.

Still referring to FIG. 1B, the network system 100 also comprises a computer 171 with hardware related software tool 160. The hardware related software tool 160 may be any hardware related software or embedded software development tool, electronic design automation tool or other software tools used in the design and development life cycle of computational hardware devices such as embedded control systems, communication devices, circuit board or any other custom electronic device or hardware. For example, the hardware related software tool 160 may be any of the hardware development tools from Cadence Design Systems, Inc. of San Jose, Calif., or from Mentor Graphics® of Wilsonville, Oreg. The hardware related software tool 160 may comprise an environment with an interface, such as an application programming interface, by which information with regards to components of a computational hardware device under design may be determined. For example, through the interface, the number, type and operational characteristics of the components of a computational hardware device may be determined from the hardware related software tool 160. Additionally, device drivers, configuration files, or any other files may be obtained from the environment provided by the hardware related software tool 160.

The graphical modeling environment 180 can access information about the design of a computational hardware device via an interface to the hardware related software tool 160 over the network 140. The hardware related software tool 160 may be running on any of the same computers 170 and 172 as either the graphical modeling environment 180 or code building tool 190. Through any form of interfacing techniques supported by the environments, the graphical modeling environment 180 and/or code building tool 190 may obtain any information associated with a computational hardware device that may be provided or accessible via the hardware related software tool 160. One ordinarily skilled in the art will recognize the multitude of interfacing approaches that can be taken to interface between environments to obtain information.

A computational hardware device may be of any type that may be modeled by the graphical modeling environment 180, such as a graphical modeling environment 180 provided by Simulink®. The computational hardware device may comprise one or more components integrated together to perform the intended purpose of the hardware design, and may comprise other computational hardware devices, which in turn may comprise one or more components. A component of a computational hardware device may comprise any type of integrated circuit or chip, such as a processor, field programmable gate array (FPGA), programmable logic device (PLD), or application-specific integrated circuit (ASIC). A processor may be any type of processor, such as a microprocessor. For example, the microprocessor may be a digital signal processor (DSP), general purpose preprocessor (GPP) or a microcontroller. Furthermore, the component may be a digital, analog or mixed-signal component. Moreover, the computational hardware device may comprise any combination of like and/or different processors, FPGAs and ASICS to form either a homogenous or a heterogeneous environment of components. For example, the computational hardware device may comprise multiple processors with one processor being a GPP and the other a DSP. Additionally, the computational hardware device may include a physical communication interface between components such as a programmable I/O, Direct Memory Access (DMA), FIFO queued buffer, etc. One ordinarily skilled in the art will appreciate the various types of components that can be designed and integrated into a computational hardware device.

In one aspect, the present invention of the graphical modeling environment 180 provides for representing in a in a block diagram model component interfaces between electronic components of a computational hardware device, such as a targeted embedded hardware board. In the graphical modeling environment 180, a block diagram model can be partitioned into multiple partitions with each partition representing a portion of a design to be implemented in code for one or more electronic components of the computational hardware device. The code may represent source code, such as C, object code or a hardware description language such as HDL. The graphical modeling environment 180 provides for identifying and configuring an interface in the block diagram model to represent a component interface between electronic components of the target device associated with separate partitions.

An interface is the connection between separate computational hardware components through hardware devices, software programs, or by a combination of hardware and software. In an exemplary embodiment, the interface between computational hardware components is implemented with both hardware and software interfaces. For example, a hardware interface between two processors may be implemented with a shared memory device providing the hardware portion of the interface. Software programs may also provide a control and communications portion of the interface. A control interface turns programming instructions from a software program into physical action on the hardware interface. For example, a read programming instruction to the shared memory hardware device requires data to be read from the physical medium of the shared memory. As such, the control interface provides the software-to-hardware interface to control the device to perform the desired programming instructions. The communication interface implements a communication protocol to enable a computational device to communicate via the interface to the hardware interface or another computational device. Furthermore, the interface may comprise additional software logic for implementation interprocess communications between computational hardware device components, such as application specific logic for coordinating and controlling an algorithm between two processors via the interface. As related to the present invention, the configuration and code generation of an interface may comprise any and all of the above aspects of an interface.

Although the term interface is discussed in singular form, an interface between computational hardware device components may have portions of the interface on one component and another portion on the other component. Interfaces typically share a boundary and may be implemented on both sides of the boundary. For example, an interface comprising a shared memory between two processors will have a portion of the interface on one processor and a portion of the interface on the second processor. The portions of the interface on each processor may read, write or otherwise share data via the share memory. So both processors will need to implement an interface to perform these actions. One ordinarily skilled in the art will appreciate the various software and/or hardware portions that may make up an interface and that the interface may be implemented on either or both sides of the interface boundary.

Figure 2:
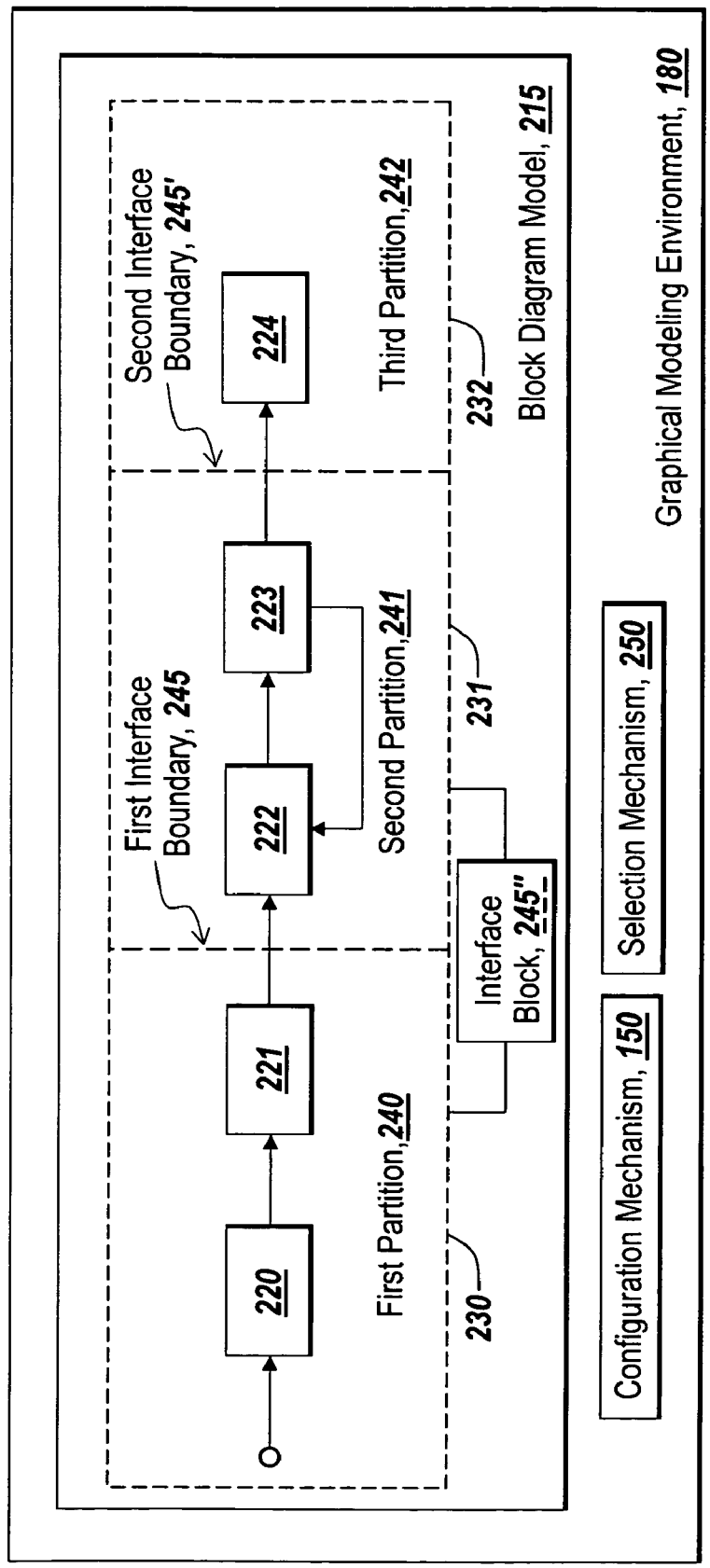
FIG. 2 is a block diagram of the components of an embodiment of the present invention in a computer system.

Referring now to FIG. 2, a system 200 depicts an embodiment of the graphical modeling environment 180 of the present invention. The graphical modeling environment 180 provides for creating, editing, modifying, saving, loading or for otherwise generating a block diagram model 215. Through the graphical modeling environment 180, one or more functional blocks 220-224 are created, assembled and connected to form a block diagram model 215. For example, functional blocks 220-224 are connected together to form the block diagram model 215. Each of the blocks 220-224 may represent one or more algorithms, computations, etc. or a portion thereof. Although generally discussed in terms of a block diagram model 215, the block diagram model 215 may comprise one or more sub-models, or sub-systems, organized and incorporated in such a manner as to represent one model or design. Each sub-model or sub-system may also have a block diagram model 215. Furthermore, one or more of the blocks 220-224 may each represent a computation or algorithm to be performed on a single component of a target device having multiple components. In this manner, a single block diagram model 215 or a top level block diagram model 215 may represent the design for multiple components of a computational hardware device. This allows the entire algorithm to be implemented across multiple components of the device to be simulated together in a single design, or at once, using a graphical modeling environment 180 such as Simulink®.

The graphical modeling environment 180 may also comprise a selection mechanism 250 to select one or more blocks 220-224 for partitioning the block diagram model 215 into one more partitions 240-242, e.g., a first partition 240, a second partition 241, and a third partition 242. A partition is a representation in the block diagram model 215 of a logical grouping of one or more blocks organized and associated together. For example, a partition, e.g., first partition 240, may be a subset of blocks, e.g., blocks 220 and 221, of the block diagram model 215 organized as group to represent a design for implementation on a component of a computational hardware device. In one embodiment, the selection mechanism 250 of the configuration mechanism 150 may comprise using a pointing device to draw a box around one or more blocks 220-221 to select the blocks 220-221 as a partition 240. Once the box is drawn around the blocks 220-221, the blocks 220-221 may become highlighted, shown by a change in color, to show a selected state. Either automatically after drawing the box, or by a click of a mouse or by selecting a menu item, a graphical user interface form may be displayed to provide user interface widgets for naming and setting properties of the partition 240. In another embodiment, each block 220-221 to be associated with a partition 240 can be selected by clicking on the blocks 220-221 to toggle the blocks 220-221 to a selected state which may be shown by a color change or other visual indicator. After selecting all the blocks 220-221 to be grouped into a partition 240, a graphical user interface, such as one provided by the configuration mechanism 150, may be invoked to set the name of the partition 240 and associate the blocks 220-221 with the partition 240, for example, by a choose list widget. In a further embodiment, each block 220-221 may be selected with a pointing device and a graphical user interface form invoked for associating the selected blocks 220-221 with a partition 240. One ordinarily skilled in the art will recognize the various user interface mechanisms that could be configured in the graphical modeling environment for selecting blocks of the block diagram model to form a partition.

In operation, the graphical modeling environment 180 provides a block diagram model 215 representing a design targeted to be implemented in code to execute on components of a computational hardware device. For example, the block diagram model 215 may represent an algorithm to be implemented in a multiple processor computational hardware device with each processor being a different type or of the same type. Through the configuration mechanism 150 of the graphical modeling environment 180, a user can select one or more blocks 220-221 to form a first partition 240, and a second set of blocks 222-224 to form a second partition 241. By default, this may leave a remaining block 224 to form a third partition 242. The first partition 240 may have been selected to implement a portion of the design in a first processor of the computational hardware device, and the second partition 241 to implement another portion of the design in a second processor. That is, the functional blocks 220-221 of partition 240, or functional blocks 222-224 of partition 241, may comprise design elements representing operational features or capabilities of the first and second processors, respectively. As such, the design elements may represent the design of code targeted to be generated in a program to run on the processors.

The graphical modeling environment 180 can provide a visual indicator showing the partitioning of the block diagram model 215. In one embodiment, the graphical modeling environment 180 may provide a box with a certain line type and/or color around each of the partitions 240-242. In another embodiment, each partition 240-242 may have a change in the color of background in contrast to the graphical modeling environment 180. In another embodiment, each of the functional blocks 220-224 may be tagged or annotated with text or a reference number to indicate association with a specific partition 240-242. In another embodiment, the graphical modeling environment 180 may place each partition 240-242 into a separate frame or window. One ordinarily skilled in the art will recognize the various permutations and combinations of indicators, visual or otherwise, that the graphical modeling environment 180 may provide to show the partitioning of the block diagram model 215.

After creating one or more partitions in the block diagram model 215, a partition 240 may be configured via the configuration mechanism 150. Since the functional blocks 220-221 of the partition 240 may be designed for implementation as code to run in a target component, a partition 240 may be configured to identify the name and type of a component to be associated with the partition 240. The configuration mechanism 150 may provide a graphical user interface form with widget controls to receive user input about the name and type of component. For example, the component may be a processor of a certain brand and speed. Also, the component may be an IC, which may be a FPGA, PLD or ASIC, and each of a certain brand and type. In another example, the component may be defined as a system, custom hardware or any computational hardware device. For configuring a partition 240, the graphical user interface of the configuration mechanism 150 may allow a selection of the name and type of component from a choose list of registered or known components.

Furthermore, the partition 240, or the functional blocks 220-221 of the partition 240, may be configured to define one or more operational characteristics of the associated component such as any features, properties, or parameters related to the operation of the component. For example, if the partition is associated with a processor type of component, the configuration mechanism 150 may provide a graphical user interface that allows for the configuration of the size, speed and type of on-chip memory elements of the processor. In another example, it may provide for the definition of the register size of the processor such as 8-bit, 16-bit, 32-bit, 64-bit, etc. In yet another example, the configuration of a processor component for a partition may indicate whether or not the processor has floating-point capabilities. One ordinarily skilled in the art will recognize that in the design of a computational hardware device the various operational characteristics of components that may be specified or configured, and which affect functionality, performance, versatility, cost and other design related factors if the design is implemented. One ordinarily skilled in the art will also recognize that the configuration mechanism 150 may use any suitable means to provide for configuration in accordance with the present invention. For example, the configuration mechanism 150 may perform configuration via files, databases, script or via a command line interpreter.

Through partitioning, the block diagram model 215 may form one or more interface boundaries 245, 245' representing a component interface between a component associated with one partition and another component associated with an adjacent partition. The interface boundary 245 is a visual interface indicator representing a component interface between electronic components. The interface indicator can be defined, configured, or otherwise associated with a component interface type. In one embodiment, an interface boundary 245 may be placed or positioned at a desired interface point between blocks of the block diagram model 215. An interface point is any portion of the block diagram model that may represent, graphically or otherwise, a location or place in the design at which a component interface is required or desired. In another embodiment, the interface boundary 245 may be formed or otherwise identified as the boundary of a partition 240-242. For example, the first interface boundary 245 may be identified as the right side boundary of the box 230 representing the first partition 240. That is, the partition 240 can include a graphical element to show the grouping of the blocks that form the partition 240, for example, a box 230 around the group of blocks making up the partition 240. The boundary of the partition box 230 for the first partition 240 may touch or otherwise be near a boundary of a partition box 231 of the adjacent second partition 241. For example, the right side of the partition box 230 of the first partition 240 or the left side of the partition box 231 of the second partition 241 may comprise the first interface boundary 245. If the right side of the partition box 230 of the first partition 240 touches or intersects the left side of the partition box 231 of the second partition 241, the intersection line of these boxes may form the first interface boundary 245. Likewise, the partition box 231 of the second partition 241 and the partition box 232 of third partition 242, alone or in combination, may form the second interface boundary 245'.

In this manner, the partitioning of the block diagram model 215 can form interface boundaries 245, 245' in that any adjacent partitions have an interface boundary to be identified and configured. By choosing a different partitioning of the block diagram model 215, the interface boundary 245 is effectively moved according to the placement of the partition 240 or the partition 241. For example, the first partition 240 could have been formed around block 220 and the second partition 241 around block 221. This would position the first interface boundary 245 to be between blocks 220 and 221. In a similar manner, the second interface boundary 245' is formed accordingly by the adjacent grouping and placement of the second partition 241 and the third partition 242. Alternatively, the first interface boundary 245 may also be effectively moved by the placement of the second partition 242 with respect to the first partition 241. One ordinarily skilled in the art will appreciate that repartitioning the block diagram model 215 may result in different arrangements of interface boundaries 245, 245'.

In one embodiment, the interface boundaries 245, 245' may be visually indicated separately from partitioning. A separate graphical element representing an interface boundary 245, 245' may be placed via the configuration mechanism 150 in between blocks and/or partitions 240-242 of the block diagram model 215. For example, the interface boundaries 245, 245' may comprises a movable graphical symbol, such as a dotted-line, or a graphical widget such as an interface object, or any other suitable element to represent an interface boundary 245, 245'. In another embodiment, the graphical modeling environment 180 provides an interface block 245" to represent an interface boundary in order for a component interface to be configured and connected into the block diagram model

215. For example, one end of the interface block 245" may be connected to the first partition 240, or a block of the first partition 240, and on the other end the interface block 245" may be connected to the second partition 241, or a block of the second partition 241. The graphical modeling environment 180 may provide a set of various interface type blocks 245", each representing a different type of component interface. One ordinarily skilled in the art will appreciate the various forms the configuration mechanism may use to represent an interface boundary and/or component interface in the graphical modeling environment.

The configuration mechanism 150 also provides the capability to define and configure a component interface as indicated by, or otherwise associated with an interface boundary 245, 245'. For example, the configuration mechanism 150 may provide a selectable list of possible component interfaces based on the type of components being interfaced. The configuration of the component interface may define the physical, communication and control interfaces to be implemented between components. The configuration of the component interface may comprise defining the physical interface as having a programmable I/O, DMA, shared memory or other physical element or component. It may also define the communication portion of the component interface such as using a TCP/IP socket communications, or reading and writing to shared memory areas. The configuration of the component interface may also include defining any device drivers to support the communication interface over the physical communication interface. Furthermore, the configuration of the component interface may also include the definition of any algorithms for sharing data, transferring data, handshaking, synchronizing processing, or otherwise controlling and coordinating inter-process communications between the components. One ordinarily skilled in the art will appreciate the different interfacing aspects that may be configured to define a component interface between different types of components represented by an interface boundary in a block diagram model.

In an exemplary embodiment, the graphical modeling environment 180 is hardware-aware, and as such, can provide a list of component interfaces based on the one or more computational hardware devices targeted to be implemented with, or otherwise associated with the design of the block diagram model 215. The graphical modeling environment 180 can be hardware-aware through a variety of means, such as through a registration of a list of component interfaces, registration or discovery of one or more topologies of computational hardware devices, access to a library of component interfaces, or by allowing the configuration of user specified component interfaces, or portions thereof.

In one embodiment, the graphical modeling environment 180 may generate the list of possible component types from the configuration of the partitions 240-242. For example, the first partition 240 may be associated with a first processor type and the second partition 241 may also be associated with another type of processor. The graphical modeling environment 180 through the configuration of partitions 240-242 may provide a shared memory type of interface as one of the selections. In another embodiment, the definition and configuration of a component interface represented by an interface boundary 245, 245' is automatically determined by the graphical modeling environment 180 based on a hardware topology of the computational hardware device associated with the block diagram model 215.

In one embodiment, the hardware topology of the computational hardware device being modeled in the graphical modeling environment 180 may be pre-registered, pre-defined, listed, or otherwise configured in the graphical modeling environment 180. This may be done by any configuration interface provided by the graphical modeling environment 180 such as the configuration mechanism 150. The hardware topology may include the name, type, description and configuration of the electronic components of the computational hardware device. It may also include the name, type, description and configuration of component interfaces, including processor-to-processor interfaces, integrated circuit-to-processor interfaces and integrated circuit-to-integrated circuit interfaces. In another embodiment, the hardware topology of the computational hardware device is discovered via an interface to the hardware related software tool 160. For example, the graphical modeling environment 180 may make an API call to another application to provide a list and description of computational hardware devices. The graphical modeling environment 180 may comprise a knowledge database, business rule logic, library or any other software component to determine the interface 245 between components based on component types, operational characteristics of components and any other design configurations which may have been pre-registered, configured or discovered.

In another embodiment, the graphical modeling environment 180 can have a library of component interfaces registered with or otherwise listed with or available to the graphical modeling environment 180. The library of component interfaces can be provided by the configuration mechanism 150 in defining and configuring component interfaces of interface boundaries 245, 245' for the block diagram model 215. For example, the configuration mechanism 150 may provide a choose list of selectable component types from one or more component libraries readable by the graphical modeling environment 180. In a further embodiment, a user via the configuration mechanism 150 may be able to point to or reference a user provided component interface. For example, there may be a custom device driver as part of a custom type of component interface stored on a computing device 102 on the network 140. The configuration mechanism 150 may allow the user to define a custom type of component interface associated with an interface boundary 245, 245' and may allow the user to provide a reference to or define a link, such as a file path or a Uniform Resource Locator (URL), to the custom device driver.

With the configurability of the partitions 240-242, interface boundaries 245, 245', and associated component interfaces in the graphical modeling environment 180 of the present invention, the same model represented by the block diagram model 215 can be implemented across multiple different types of computational hardware devices and have different interfaces configured and implemented. For example, the block diagram model 215 may be initially partitioned as shown in FIG. 2 for a first computational hardware device with two processors and an FPGA. The first partition 240, and therefore the algorithms, functionality and operations of blocks 220-221, can be targeted to execute on the first processor. Likewise, the blocks 222-223 of the second partition 241 can be targeted to execute on the second processor. The functionality of block 224 of the third partition 242 can be targeted to be implemented on the FPGA. In accordance with the topology of the first computational hardware device and the configured partitioning of the design in the block diagram model 215, the first interface boundary 235 may be configured to define a processor-to-processor interface, such as a buffered parallel I/O interface operating synchronously or asynchronously, and the second interface boundary 235' may be configured to define a processor-to-FPGA interface such as a FIFO buffer interface.

Without changing any of the blocks 220-224, the design of the block diagram model 215 can be re-targeted for implementation on a second computational hardware device with a different topology than the first, and therefore different component interfaces. For example, the second computational hardware device may comprise a processor and a FPGA. The first partition 240 may be re-positioned, changed, or otherwise formed around blocks 220-222, instead of blocks 220-221 as in the example with the first computational hardware device. In a similar manner, the second partition 241 may be formed around blocks 223-224. The third partition 242 would not be needed for this topology and therefore may be removed. Accordingly, a first interface boundary 235 is identified or positioned between the third block 222 of the first partition and the fourth block 223 of the second partition. As there are only two partitions in this example, a second interface boundary is not identified, and if one already exists, it may be removed. The first interface boundary 235 may represent a processor-to-FPGA interface supported by the topology of the second computational hardware device, e.g., a shared memory interface. Likewise, the design of the block diagram model 215 can be re-targeted for implementation on a second computational hardware device that is of the same or similar type of topology as the first computational hardware device. For example, the number and type of electronic components on the second computational hardware device may be the same as the first computational hardware device but some aspect of the physical interfaces may have changed. One ordinarily skilled in the art will appreciate that the present invention applies to targeting and re-targeting implementations on any type of computational hardware device.

Figure 3:
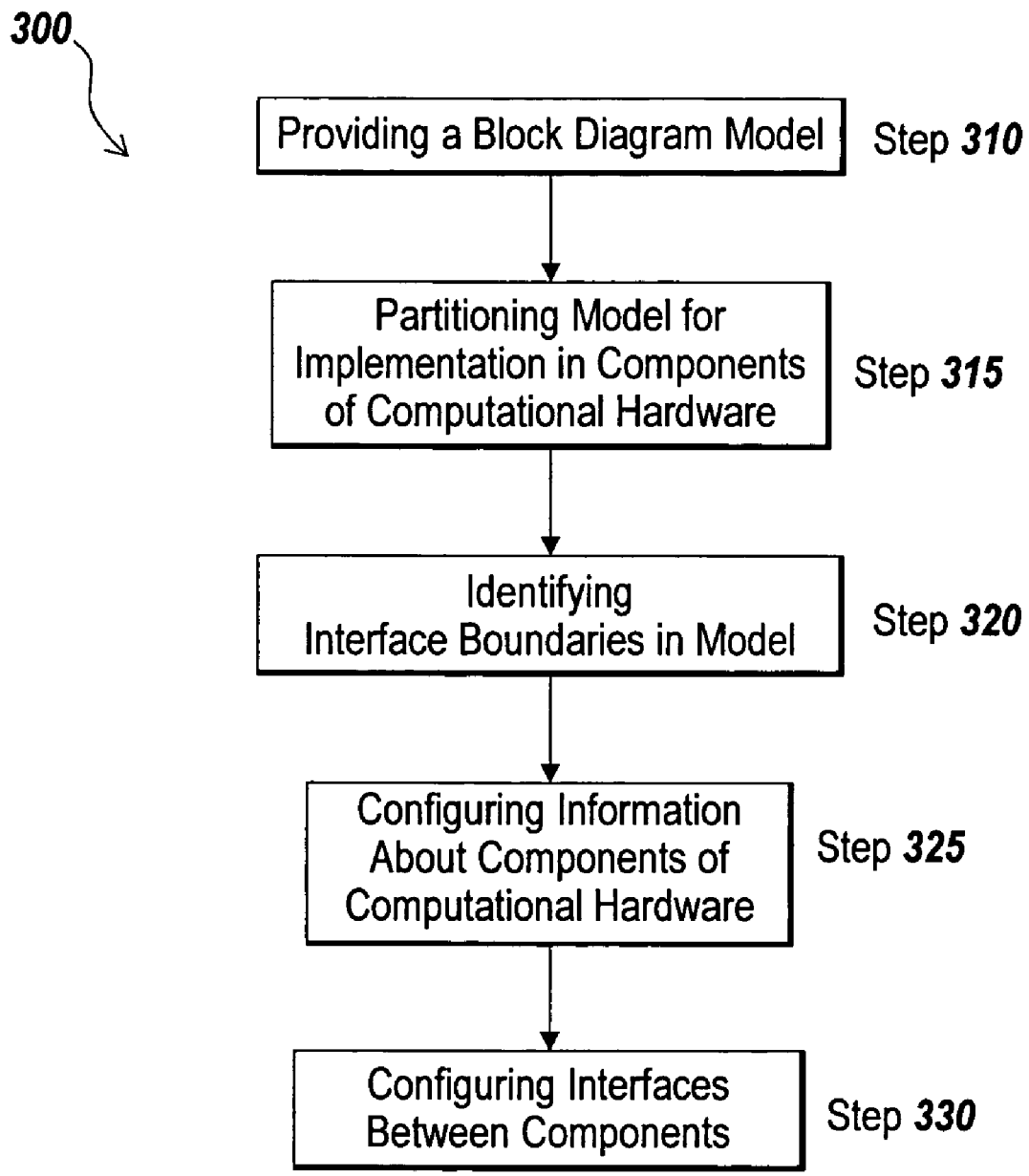
FIG. 3 is a flow diagram illustrating steps performed in practicing an embodiment of FIG. 2.

In another aspect, the present invention relates to a method of identifying interface boundaries 245 in a block diagram model 215 as practiced in relation to the illustrative embodiment shown in FIG. 2. The flow diagram of FIG. 3 depicts an illustrative method for partitioning a block diagram model 215 into partitions associated with components of a computational hardware device and defining interfaces 245, 245' between components of the partitions 240-242. The method includes the step 310 of providing a block diagram model 215, and the step 315 of partitioning the block diagram model 215 into one or more partitions 240-242 for implementation in one or more components of a computational hardware device. In the graphical modeling environment 180, a user via the configuration mechanism 150 selects one or more functional blocks 220-221 of the block diagram model 215 to be grouped or organized into a partition, for example, the first partition 240. The user may continue to create multiple partitions by selecting one or more blocks to form additional partitions 241-242. One ordinarily skilled in the art will appreciate the different ways one may partition a block diagram model 215.

At step 320 of the illustrative method, interface boundaries 245, 245' are indicated in the in the block diagram model 215 to represent component interfaces. The interface boundaries 245, 245' may represent a component interface between components associated with each adjacent partition, e.g., the first partition 240 and the second partition 241. As discussed above, an interface boundary 245, 245' can be defined by the partitioning mechanism or via a separate interface boundary indicator. In one embodiment of this method, the block diagram modeling environment 180 may provide a grouping and selection mechanism 250 to group one or more blocks 220-224 into a partition 240-242, and may provide a visual indicator to show the representation of each partition 240-242. For example, each partition 240-242 may be highlighted with a box of a certain line type and/or color that visually groups the functional blocks making up a partition. The boundaries of adjacent partitions may provide the interface boundary 245, 245' representing a component interface to be implemented across the interface boundary 245, 245' between components of the adjacent partitions 240-242. In another embodiment, a visual indicator for an interface boundary 245, 245', for example, a graphical element or widget, may be positioned between blocks 220-224 and/or partitions 240-242 to form an interface boundary 24, 245'. For example, the first interface boundary 245 shown in FIG. 2 is positioned between the first partition 240 and the second partition 241, and between block 221 and block 222.

The illustrative method of FIG. 3 further includes the step 325 of identifying components and configuring information about the components of the computational hardware device associated with a partition 240. Step 330 of the illustrative method further includes identifying and configuring the component interface associated with an interface boundary 245, 245'. At step 325 of the illustrative method, a user via a configuration mechanism 150 can define the type, name and operational characteristics of one or more components to be represented by a partition 240-242. As such, each partition 240-242 can be configured to represent multiple components of a computational hardware device. At step 325 of the illustrative method, a user may define via a configuration mechanism 250 a component interface associated with an interface boundary 245 between a component of the first partition 240 and a component of the second partition 241. The user may also identify and configure the component interface by selecting and connecting an interface block 245" representing a particular type of interface, e.g., programmable I/O functional block, to interface between a component associated with the first partition 240 and a component associated with the second partition 241.

In another embodiment, the graphical modeling environment 180 may be hardware-aware, and automatically determine and provide a configuration of a component interface of an interface boundary 245, 245' based on the definition and configuration of components or based on the hardware topology discovered via an interface to the hardware related software tool 160.

Although the illustrative method of FIG. 3 are generally discussed with respect to the block diagram model 215 of FIG. 2, one ordinarily skilled in the art will appreciate how the steps of this method may be applied to a new block diagram model 215 without any partitioning and interface boundaries yet configured, or how the steps and variations thereof may be repeated multiple times to an existing block diagram model 215. Additionally, in an existing block diagram model 215, such configuration can be deleted and then these methods re-applied.

With the illustrative method shown in FIG. 3, the same block diagram model may be re-targeted for different computational hardware devices without changing the design and/or blocks of the block diagram model 215. Through the flexibility of the partitioning of step 315 and indicating interface boundaries of step 320 as described above, the same block diagram model 215 can be configured for implementation to different target devices, each with different components and component interfaces. This allows a single design to be simulated at once without separating the simulation into different design pieces, such as a block diagram model suitable only to a specific component implementation. In this aspect, the design of the blocks 220-224 of the block diagram model 215 can represent a design that may be implemented on a wide range of target devices with the partitioning and interface boundary placement providing the configuration for a target implementation. As will be discussed below, the techniques of the present invention also allows the same block diagram model 215 to act as an input file for automatic code generation of implementations on different target devices. In one instance, the block diagram model 215 with a first configuration of partitions 240-242, interface boundaries 245, 245' and associated component interfaces could be used to generate code to run on a first device. Then, the same block diagram model 215 with a second configuration of partitions 240-242, interface boundaries 245, 245' and associated component interfaces could be used to generate code to run on a second device with different components or component types than the first device.

Moreover, the same block diagram model 215 may be re-targeted for the same or different computational hardware devices without changing the graphical representation of either the block diagram model 215 and/or the interface boundary 245. By way of illustration, a block diagram model 215 may have two blocks, each representing a design to be implemented in a processor of a first multi-processor device. An interface boundary 245 may be provided between the two blocks of the block diagram model 215 to represent a component interface. In one example, the target computational hardware device may have one or more component interface types between the processors, such as a serial I/O interface and a shared memory interface. In one implementation case, the interface boundary 245 may be configured to be associated with the serial I/O interface component type. Without changing the graphical representation of the interface boundary 245 and/or blocks of the block diagram model 215, the interface boundary 245 can be re-targeted to be associated with the shared memory type of component interface. In this manner, the same interface boundary 245 can be applied to different component interface types without replacing or changing the interface boundary to a different or new interface boundary, or to an interface boundary specific to the component type.

In continuing the example, the same block diagram model 215 can also be re-targeted to a second multi-processor device with different component interfaces than the first multi-processor device without changing any of the blocks of the block diagram model 215 and/or the interface boundary 245. The interface boundary 245 can be associated with any one of the one or more component interface types of the second multi-processor device. Furthermore, even if one or more blocks of the block diagram model 215 are changed, modified or edited to re-target the design to another multiple component device, the interface boundary 245 can be maintained in the block diagram model 215. The interface boundary 245 can be maintained in the block diagram model 215 and associated with any of the one or more component interface types of the target device even though it may have been previously associated with a different component interface type of a different target device. Additionally, the interface boundary 245 can be maintained in the block diagram model 215 even if the electronic components associated with the blocks connected to the interface boundary 245 change, are re-targeted to a different device, are re-targeted to different components of the same device, or retargeted to the same or different components of a different device. In any of the cases in the above illustrative example, the present invention can generate code from the block diagram model 215 to represent any of the component interface types that may be associated with and represented by one or more interface boundaries 245 in the block diagram model 215.

Although re-targeting a block diagram model 215 is generally discussed above in terms of not changing the block diagram model 215 and/or the interface boundary 245, portions of the of the block diagram model 215 and/or the interface boundary 245 may be changed, modified or otherwise manipulated while maintaining the graphical representation of the design of the block diagram model and the interface boundary within the intent and scope of the present invention. The interface boundary 245 of the present invention provides great flexibility and re-usability in that the same interface boundary 245 can be re-targeted to different component interfaces of the same or different target device. Furthermore, the same design of a block diagram model 215 with one or more interface boundaries 245 can be re-targeted to different target devices. In some embodiments, the interface boundary 245 may have some visual indication of the component interface type or other associated attributes describing information about the component interface target. In other embodiments, the interface boundary 245 may be re-positioned or adjusted while graphically representing the component interface between the components associated with the blocks of the block diagram model 215. Even if the interface boundary 245 is manipulated in the block diagram model 215, the interface boundary 245 may continue to graphically represent the component interface, and the interface indicator does not need to be replaced or changed in order to support different component interface types. In a similar manner, blocks of the block diagram model may be changed or manipulated and the block diagram model maintains the graphical representation of the same design.

Figure 4:
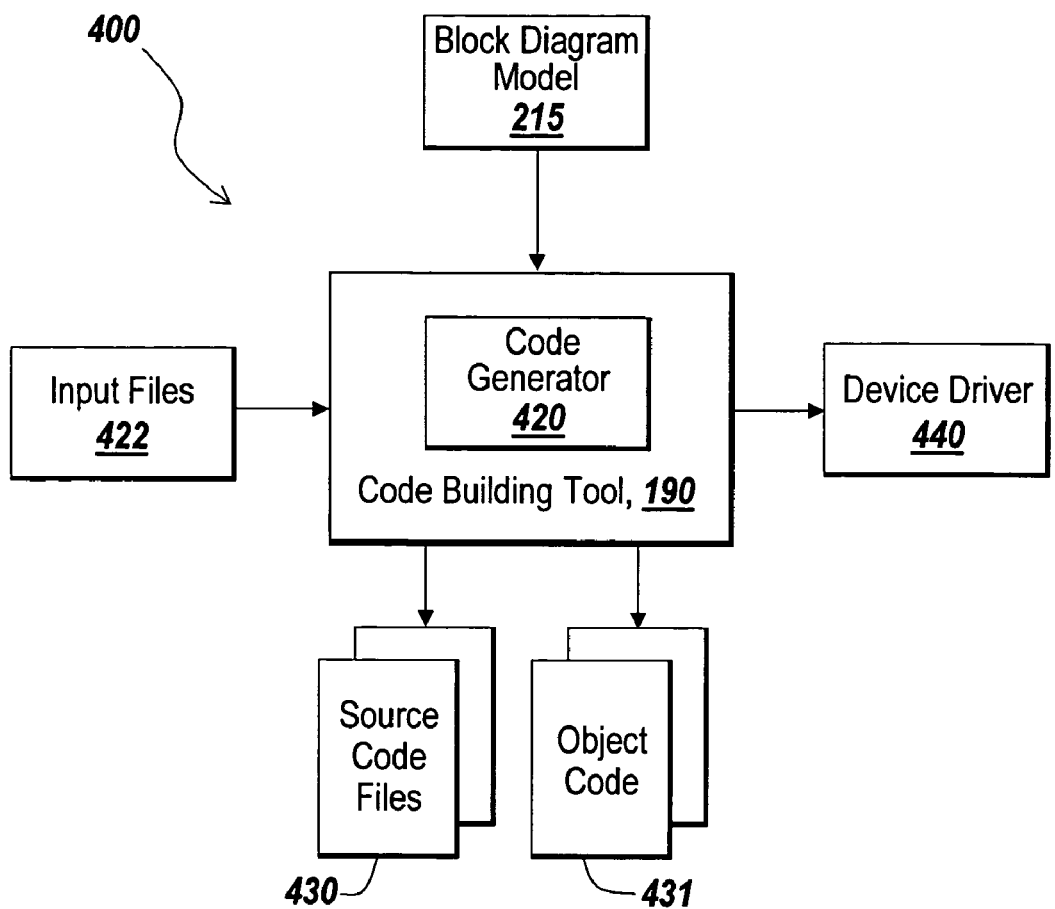
FIG. 4 is a block diagram of the components of another embodiment of the present invention.

In one aspect, the present invention relates to the automatic generation of code from a block diagram model 215, such as a partitioned block diagram model 215 described above. The code building tool 190, such as Real-Time Workshop®, will generate code on a partition basis and generate code targeted for the one or more components of a partition. Furthermore, the code building tool 190 will generate code to implement the interface between electronic components as may be represented by the block diagram model 215. Referring now to FIG. 4, an illustrative embodiment of the code building tool 190 is depicted. In brief overview, the code building tool 190 comprises a code generator 420 that obtains a block diagram model 215 and may obtain one or more input files 422 and/or device drivers 440 to be used to automatically generate source code files 430 and object code files 431 from the block diagram model 215.

The block diagram model 215 may comprise a partitioned block diagram model 215 with multiple partitions 240-242 and one or more interface boundaries 245, 245', such as a block diagram model 215 provided by or generated with the graphical modeling environment 190 described above. In other embodiments, the block diagram model 215 may be obtained from another graphical modeling environment, technical computing environment or otherwise generated with other software tools. The block diagram model 215 may comprise a file in a format that the code building tool 190 or code generator 420 can read and that follows a file specification for defining partitions 240-242 and interface boundaries 245, 245'. In other embodiments, the code generator 420 may obtain the block diagram model 215 from an application programming interface (API) call to another application or via an interface to another environment. In yet a further embodiment, the graphical modeling environment 180, or another computer program, saves and converts the block diagram model 215 into a format readable by the code building tool 190. For example, a block diagram model 215 produced with Simulink® may be converted into an intermediate model file representation such as a .rtw type file readable by the automatic code generator of Real-Time Workshop®.

The one or more input files 422 may comprise files including templates, commands, input parameters, configuration data, source code, data and class definitions, component configuration, device driver or any other information that may be used by the code generator 420 to generate code for the block diagram model 215. The input files 422 may include files to provide input to and configure the code generator 420 to generate source code files 430 for a specific target hardware platform, for example, a specific processor, and for a specific type of interface 245, e.g., a shared memory interface between two processors. In an exemplary embodiment of Real-Time Workshop® as the code generator 420, Real-Time Workshop® uses target language compiler script files, with a .tlc file extension, as input files 422 to the code generation process. The .tlc files provide sections of programming instructions to be implemented for block references as they may be found in a block diagram model 215 during the code generation process. The .tlc files also can provide data and class definitions for data element references found in the block diagram model 215. Additionally, the .tlc files also comprise compiler directives, built-in functions and other code generation commands to direct Real-Time Workshop® during the code generation process.

In operation, the code generator 420 reads in the block diagram model 215 and uses the input files 422 to generate code by translating the block diagram model 215 into one or more source code files 430. By way of example, the automatic code generation can be discussed in terms of generating code with Real-Time Workshop® from a block model diagram 215 generated with Simulink®. Simulink® creates and stores block diagram models into model files with an .mdl file extension. As part of the code generation process, Real-Time Workshop® reads in an .mdl model file and analyzes the model to generate an intermediate model file with an .rtw extension. This intermediate .rtw model file comprises a hierarchical structure of records describing systems and their blocks and connections analyzed from a block diagram model 215 of the .mdl file.

A language compiler called the target language compiler of Real-Time Workshop® works with .tlc files and .rtw files to produce code. The target language compiler interprets a program that reads the intermediate model file description of an .rtw file. As the target language compiler encounter a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 422. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 430 generated from the code generator 420, such as Real-Time Workshop®, may comprise program instructions of a programming language, such as C, which may further be in a format and style following the ANSI/ISO C standard. Additionally, the source code files 430 may be generated to comprise fixed-point or floating-point source code. The programming instructions of the source code files 430 may be generated to run on any real-time operating system or for a specific processor. In a further embodiment, the programming instructions of the source code files 430 may be optimized for performance or versatility, and/or for a specific target hardware platform. In another embodiment, the code generator 420 can be configured via the input files 422 to generate custom source code comprising a style and format as directed by the input files 422. The code generator 420 can be also configured via the input files 422 to provide customized source code to support such customizations as error handling, optimization, code and data reduction, code reusability, scoping of variables, and other characteristics of the source code that may be modified during the source code generation process.

For each partition 240-242 in a block diagram model 215, the code generator 420 can generate source code in one or more source code files 430 to target implementation in the component of the computational hardware device associated with the partition 240. For example, the code generator can generate source code for a partition 240 representing an algorithm to be implemented on a specific microprocessor. The code generator 420 can generate source code for each of the partitions 240-242 of the block diagram model 215 with each partition 240 representing a different component of the computational hardware device. For example, the code generator 420 may generate source code 430 for a processor type component of a first partition 240 and source code for an IC type component of a second partition 241. In a further example, the code generator 420 may generate source code 430 targeted for a specific integrated circuit component such as a FPGA, PLD or ASIC, including any suitable device drivers 440. One ordinarily skilled in the art will appreciate the functionality, operations, and instructions of the source code for a component interface and/or device driver 440 that may be implemented for any type of computational hardware device.

Furthermore, the code generator 420 generates source code 430 for any component interface of an interface boundary 245, 245' defined in the block diagram model 215. The code generator 420 can generate source code 430 and/or device drivers 440 for various physical communication interfaces such as programmable I/O, DMA, shared memory, FIFO buffer that may be configured between components of partitions 240-242. The code generator 420 can generate code for sharing data, transferring data, handshaking, synchronizing processing, or otherwise controlling and coordinating interprocess communications between the components as may be directed by the definition and design of the interfaces 245 in the block diagram model 215. Furthermore, the code generator 420 can generate source code 430 for processor-to-processor interfaces, processor-to-IC interfaces and IC-to-IC interfaces as they may be defined and configured in the block diagram model 215. Additionally, the source code 430 may comprise source code for one or more device drivers, or portions thereof, related to the interfaces. The programming instructions for code for component interfaces and for code to run on components may be generated from logic or business rules built into the code building tool 190, or otherwise provided via the input files 422.

Although the code generator 420 is generally discussed in terms of generating source code, the code generator 420 may provide code in any other form, such as object code, pre-existing source code, or other programmable instructions suitable for representing the functionality of the block diagram model 215. In one embodiment, the graphical modeling environment 180 has a library of component interfaces that may provide input to the code generator 420 via the input files 422. The library of component interfaces may comprise code for each of the component interface types provided by the library. For example, for a component type in the library there may be a corresponding device driver 440, either in source code, object code, or other executable form to incorporate into the automatic code building process described herein. As such, the code generator 420 may generate code by providing links to, integrating, or otherwise incorporating other forms of code such as pre-existing source code listings/files, device drivers, libraries, object code, scripts, other programs, or any other collection or form of code that is configured to or otherwise capable of providing the target functionality of the component programs and component interfaces generated by the code generator 420 of the present invention.

In an exemplary embodiment, the code for each of the component interfaces becomes a part of and is integrated with the code for the partitions 240-242 interfacing across the interface boundary 245. For example, the component interface for the first interface boundary 245 between a first component of a first partition 240 and a second component of a second partition 241 may be configured to have the first component send data to the second component, and the second component to receive data from the first component. The code for the sending portion of the component interface for the first interface boundary 245 would be generated as part of the code of the first partition 240 to build a program to run on the first component. Likewise, the code for the receiving portion of the component interface of the first interface boundary 245 would be generated to be a part of the code of the second partition 241 to build a program to run on the second component. In this manner, the component interface of the interface boundary 245 configured between the partitions 240 and 241 is implemented accordingly in code for each of the components. In other embodiments, there may be a one-way component interface where the code generated for a component interface may get generated in one partition. One ordinarily skilled in the art will appreciate the different permutations of how a component interface for an interface boundary 245 may get implemented across multiple components.

The code building tool 190 also provides for the building of the source code files 430 into object code 431 to generate one or more programs to run on the target components. The build process may include compiling the code and linking libraries, drivers 440 and other programs via a make program or some other compiling utility. In one embodiment, the code building tool invokes a compiler provided by software available with the operating system, such as a make utility on a UNIX operating system. In another embodiment, the compiler may be provided from a software development package such as Visual C/C++ from Microsoft. One ordinarily skilled in the art will recognize the code building tool 190 may invoke any type of compiler that is configured to and capable of translating the source code 430 into object code 431 to be executed by the target computation device. In another embodiment, the code generator 420 may allow the linking of a user provided device driver 440 when compiling the source code 430 into object code 431. The device driver 440 may be of any type of driver to appropriately support the interface 245 between components, for example, a driver to send and receive data over the physical communication interface. Furthermore, the device driver 440 can include any form of executable instructions such as source code, object code, a library, or a program. Additionally, the build process provided by the code building tool 190 may include downloading or otherwise transmitting the executable to the target hardware via an editor, debugger or download utility.

Although the illustrative embodiment of the present invention is discussed in terms of source code files 430 and object code 431 from a programming language like C, the code generator 420 may generate any type of programming related output, such as an interpreted programming language and/or scripting language. For example, the code generator 420 may generate code for per, awk, VBscript, Javascript, tcl, or the technical computing programming language of MATLAB®. In other cases, the code generator 420 may generate output in other types of languages, such as the hardware description language of HDL. One ordinarily skilled in the art will recognize the various types of languages the code building tool may apply in generating code and how the code generator may build the code based on the type of language.

Figure 5:
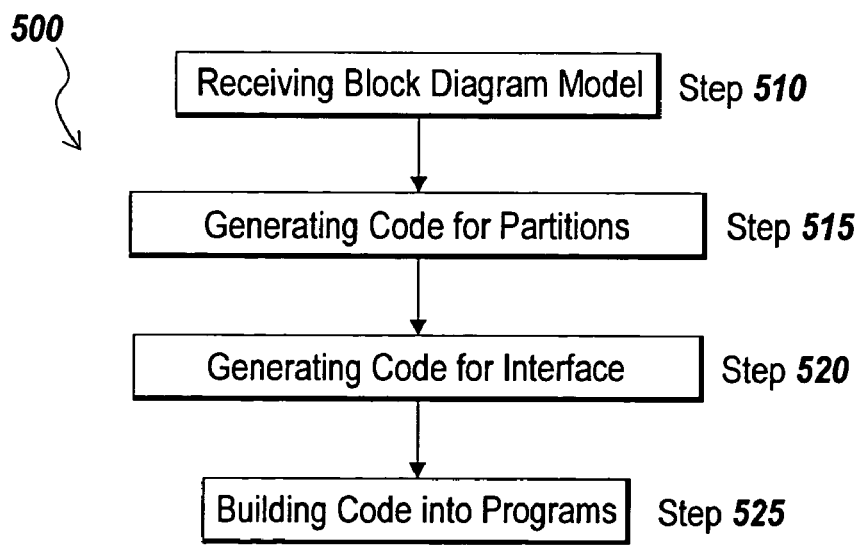
FIG. 5 is a flow diagram illustrating steps performed in practicing an embodiment of FIG. 4.

In another aspect, the present invention relates to a method for automatically generating code for interfaces between components of partitions. The flow diagram of FIG. 5 depicts another illustrative method for automatically generating code for a block diagram model 215. The method includes a step 510 of obtaining a block diagram model 215. The code building tool 190 may obtain the block diagram model 215 by reading a block diagram model file or another file representing a preprocessed or intermediate representation of the block diagram model 215. In one embodiment, the block diagram model 215 may be obtained by making an API call to another application, such as graphical modeling environment 180. In another embodiment, the graphical modeling environment 180 may trigger the code generation process by sending the block diagram model 215 to the code building tool 190 and requesting the code building tool 190 to initiate the code generation process. Additionally, the block diagram model 215 may comprise a design representation of multiple partitions 240-242 with each partition associated with one or more components of a computational hardware device. Furthermore, the block diagram model 215 may comprise the configuration of one or more component interfaces represented by interface boundaries 245, 245' between components of partitions 240-242 as discussed in conjunction with the embodiment depicted in FIG. 4.

At step 515 of the illustrative method, source code 430 for each of the partitions 240-242 defined in the block diagram model 215 is generated. The code generator 420 translates each of the blocks of a partition 240-242 into programming instructions representing the functional design of the blocks 220-224. The code generator 420 may store the programming instructions in one more source code files 430 to be built into a program. Additionally, the source code file 430 may comprise program instructions targeted for the specific type of component associated with the partition, for example, a specific processor may be associated with the first partition 240. At step 520, the illustrative method generates source code 430 for the one or more component interfaces associated with interface boundaries 245, 245' defined between components of partitions 240-242. The code generator 420 translates the definition of the component interface in the block diagram model 215 into programming instructions in the source code files 430 according to the design and configuration of the interface.

In step 520 of this illustrative method, the code generated for the interface 245 will become part of the code for each of the partitions 240-242. As discussed earlier, an interface may be implemented on both sides of an interface boundary 245, 245'. For example, the program to run on a first component associated with the first partition 240 will run a portion of the component interface associated with the interface boundary 245, and the program to run on a second component associated with a second partition 240 will run another portion of the component interface. As such, at step 530, the code is generated for the component interface associated with an interface boundary 245 to be part of the code for the respective partitions configured to be connected via the component interface. Furthermore, the method also includes the step 525 of building the generated source code 430 into object code 431 to make an executable program targeted to run on the components of the computational hardware device. As such, the object code 421 and executables will comprise the automatically generated code implementation of the component interfaces from step 520.

In view of the structure, functions and operations of the graphical modeling environment 180 and code building tool 190 as described herein, the present invention provides for a model-based design approach for implementing code for component interfaces designed in a block diagram model. Interface boundaries of a model-based design representing component interfaced do not need to be replaced or changed to represent new or different component interface types. A design modeled in the graphical modeling environment 180 for a computational hardware device having multiple components provides a design specification that can be automatically turned into a code implementation with component interfaces via the code building tool 190. In this manner, the entire design across multiple components can be simulated at once and the design can be re-targeted for different computational hardware devices without changing the model. That is, the blocks and interface boundaries of the block diagram model may stay the same and the model just re-targeted to the new topology. As such, interface boundaries and component interfaces are defined according to the new partitions and hardware topology. Code from the same block diagram model can then be re-generated according to the partitioning and component interfaces to be implemented in accordance with the new computational hardware device. Using this approach will increase quality, reduce the design time and provide for continuous testing and verification of code for computational hardware devices with multiple components.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for representing in a graphical model an interface between electronic components of a computational hardware device, the method comprising:
   providing, in a modeling environment, a graphical model representing a design for implementation in a first computational hardware device having at least a first electronic component and a second electronic component, the first electronic component and the second electronic component separated by a first interface boundary representing the interface between electronic components;
   identifying an interface point between a first part of the graphical model representing a portion of the design associated with the first electronic component and a second part of the graphical model representing a portion of the design associated with a second electronic component; and
   graphically representing via an interface indicator at the interface point in the graphical model a component interface between the first electronic component and the second electronic component, wherein the interface indicator can represent at least one type of component interface of one or more component interface types.

2. The method of claim 1, comprising identifying a component interface type from one or more component interface types to associate with the interface indicator without changing the graphical representation of one of the graphical model and the interface indicator.

3. The method of claim 1, comprising associating a component interface type from one or more component interface types with the interface indicator while maintaining the graphical representation of one of the graphical model and the interface indicator.

4. The method of claim 1, comprising associating the interface indicator with one component interface type of one or more component interfaces between electronic components different than one of the first electronic component and the second electronic component, while maintaining the graphical representation of the interface indicator.

5. The method of claim 1, wherein the design of the graphical model can be implemented on a second computational hardware device without changing the graphical representation of one of the graphical model and the interface indicator, the second computational hardware device having one or more different component interfaces than the first computational hardware device.

6. The method of claim 1, wherein the design of the graphical model can be implemented in a second computational hardware device without changing the graphical representation of one of the graphical model and the interface indicator, the second computational hardware device having one of the same electronic components as the first computational hardware device and electronic components different than the first computational hardware device.

7. The method of claim 1, comprising graphically representing via a plurality of interface indicators a plurality of component interfaces between electronic components represented by parts of the graphical model.

8. The method of claim 1, wherein one of the first electronic component and the second electronic component comprises one of a processor, a field programmable gate array, an application specific integrated circuit, and a programmable logic device.

9. The method of claim 1, wherein one of a first portion of code suitable for implementation on the first component, and a second portion of code suitable for implementation on the second component, is automatically generated from the block diagram model to provide an implementation of the component interface between the first electronic component and the second electronic component represented by the interface indicator.

10. The method of claim 1, comprising configuring, in the modeling environment, a type of the component interface associated with the interface indicator, the type obtained from one or more of the following:
   one or more component interface types listed with the modeling environment,
   a topology of one or more computational hardware devices listed with the modeling environment,
   a library of one or more component interfaces readable by the modeling environment, and
   a reference configured in the modeling environment to component interface code provided by a user.

11. A method for generating code from a graphical model representing a component interface between electronic components in a computational hardware device, the method comprising:
receiving a graphical model having an interface indicator representing a component interface between a first electronic component and a second electronic component of a computational hardware device, a first part of the graphical model represents at least a portion of a design to be implemented in the first electronic component, and a second part of the graphical model represents at least a portion of a design to be implemented in the second electronic component, the first electronic component and the second electronic component separated by a first interface boundary;
determining the component interface type represented by the interface indicator, wherein the interface indicator can represent at least one component interface type of one or more component interface types;
generating a first set of code for the first part of the graphical model that includes a first portion of the component interface to execute on the first electronic component, and
generating a second set of code for the second part of the graphical model including a second portion of the component interface to execute on the second electronic component.

12. The method of claim 11, wherein the first set of code further comprises code representative of a portion of functionality represented by the first part of the graphical model, and the second set of code further comprises code representative of a portion of functionality represented by the second part of the graphical model.

13. The method of claim 11, wherein one of the first portion of code and the second portion of code comprises code determined by a type of component interface associated with the interface indicator of the graphical model.

14. The method of claim 11, wherein one of the first electronic component and the second electronic component comprises one of a processor, a field programmable gate array, an application specific integrated circuit, and a programmable logic device.

15. The method of claim 11, comprising:
invoking a building of one of the first set of code and the second set of code into a program to execute on one of the first electronic component and the second electronic component.

16. The method of claim 11, comprising:
generating a portion of the code for the component interface between the first electronic component and the second electronic component by linking in a device driver.

17. The method of claim 11, comprising generating code for a plurality of component interfaces represented by a plurality of interface indicators in the graphical model.

18. A method for representing in a graphical model a component interface between electronic components of a computational hardware device and generating code for the component interface from the graphical model, the method comprising:
providing, in a modeling environment, a graphical model representing a design for implementation in a first computational hardware device having at least a first electronic component and a second electronic component, a first part of the graphical model represents a portion of the design for implementation in the first electronic component, and a second part of the graphical model represents a portion of the design for implementation in the second electronic component, the first electronic component and the second electronic component separated by a first interface boundary representing the component interface between electronic components;
graphically representing via an interface indicator between a first part and a second part of the graphical model a component interface for implementation between the first electronic component associated with the first part and the second electronic component associated with the second part; and
generating code for the first component interface between the first electronic component and the second electronic component.

19. The method of claim 18, wherein generating code comprises generating one of a first set of code for the first part of the graphical model comprising a first portion of the component interface to execute on the first component, and a second set of code for the second part of the graphical model comprising a second portion of the component interface to execute on the second component.

20. The method of claim 18, comprising identifying a component interface type from one or more component interface types to associate with the interface indicator without changing the graphical representation of one of the graphical model and the interface indicator.

21. The method of claim 18, comprising associating a component interface type from one or more component interface types with the interface indicator while maintaining the graphical representation of one of the graphical model and the interface indicator.

22. The method of claim 18, comprising associating the interface indicator with one component interface type of one or more component interfaces between electronic components different than one of the first electronic component and the second electronic component, while maintaining the graphical representation of the interface indicator.

23. The method of claim 18, wherein the design of the graphical model can be implemented on a second computational hardware device without changing the graphical representation of one of the graphical model and the interface indicator, the second computational hardware device having one or more different component interfaces than the first computational hardware device.

24. The method of claim 18, wherein the design of the graphical model can be implemented in a second computational hardware device without changing the graphical representation of one of the graphical model and the interface indicator, the second computational hardware device having one of the same electronic components as the first computational hardware device and electronic components different than the first computational hardware device.

25. The method of claim 18, comprising graphically representing via a plurality of interface indicators a plurality of component interfaces between electronic components represented by parts of the graphical model.

26. The method of claim 25, comprising generating code for each of the plurality of component interfaces.

27. The method of claim 18, wherein one of the first component and the second component comprises one of a processor, a field programmable gate array, an application specific integrated circuit, and a programmable logic device.

28. The method of claim 18, comprising configuring, in the modeling environment, a type of the first component interface associated with the first boundary, the type obtained from one or more of the following:
one or more component interface types listed with the modeling environment, a topology of one or more computational hardware devices listed with the modeling environment,
a library of one or more component interfaces readable by the modeling environment, and
a reference configured in the modeling environment to component interface code provided by a user.

29. The method of claim 18, comprising:
invoking a building of one of the first set of code and the second set of code into a program to execute on one of the first electronic component and the second electronic component.

30. The method of claim 18, comprising:
generating a portion of the code of the first component interface between the first electronic component and the second electronic component by linking in a device driver.

31. A system for representing in a graphical model a component interface between electronic components of a computational hardware device and generating code for the component interface from the graphical model, the system comprising:
a graphical modeling environment providing a graphical model representing a design for implementation in a first computational hardware device having at least a first electronic component and a second electronic component, a first part of the graphical model represents a portion of the design for implementation in the first electronic component, and a second part of the graphical model represents a portion of the design for implementation in a second electronic component, the first electronic component and the second electronic component separated by a first interface boundary representing the component interface between electronic components;
a configuration mechanism to graphically represent via an interface indicator between the first part and the second part of the graphical model a component interface between the first electronic component associated with the first part and the second electronic component associated with the second part; and
a code generator receiving the graphical model, and generating code for the component interface between the first electronic component and the second electronic component.

32. The system of claim 31, wherein one of the graphical modeling environment and the code generator executes on one of a first computing device and a second computing device.

33. The system of claim 31, wherein the code generator generates one of a first set of code and a second set of code comprising one of a first portion and a second portion of the component interface.

34. The system of claim 31, wherein the code generator invokes a building of one of the first set of code and the second set of code into executable instructions to execute on one of the first electronic component and the second electronic component.

35. The system of claim 31, wherein the configuration mechanism provides a user interface to define a type of the first component interface associated with the interface indicator, the configuration mechanism obtains a type of the component interface from one or more of the following:
one or more component interface types listed with the modeling environment,
a topology of one or more computational hardware devices listed with the modeling environment,
a library of one or more component interfaces readable by the modeling environment, and
a reference configured in the modeling environment to component interface code provided by a user.

36. The system of claim 31, wherein one of the first component and the second component comprises one of a processor, a field programmable gate array, an application specific integrated circuit, and a programmable logic device.

37. The system of claim 31, wherein the code generator obtains a portion of the first component interface between the first electronic component and the second electronic component by linking in a device driver.

38. A device readable medium holding device readable instructions for a method of representing in a graphical model an interface between electronic components of a computational hardware device, the method comprising:
providing, in a modeling environment, a graphical model representing a design for implementation in a first computational hardware device having at least a first electronic component and a second electronic component, the first electronic component and the second electronic component separated by a first interface boundary;
identifying an interface point between a first part of the graphical model representing a portion of the design associated with the first electronic component and a second part of the graphical model representing a portion of the design associated with a second electronic component; and
graphically representing via an interface indicator at the interface point in the graphical model a component interface between the first electronic component and the second electronic component, wherein the interface indicator can represent at least one type of component interface of one or more component interface types.

39. The medium of claim 38, comprising identifying a component interface type from one or more component interface types to associate with the interface indicator without changing the graphical representation of one of the graphical model and the interface indicator.

40. The medium of claim 38, comprising associating a component interface type from one or more component interface types with the interface indicator while maintaining the graphical representation of one of the graphical model and the interface indicator.

41. The medium of claim 38, comprising associating the interface indicator with one component interface type of one or more component interfaces between electronic components different than one of the first electronic component and the second electronic component, while maintaining the graphical representation of the interface indicator.

42. The medium of claim 38, wherein the design of the graphical model can be implemented on a second computational hardware device without changing the graphical representation of one of the graphical model and the interface indicator, the second computational hardware device having one or more different component interfaces than the first computational hardware device.

43. The medium of claim 38, wherein the design of the graphical model can be implemented in a second computational hardware device without changing the graphical representation of one of the graphical model and the interface indicator, the second computational hardware device having one of the same electronic components as the first computational hardware device and electronic components different than the first computational hardware device.

44. The medium of claim 38, comprising graphically representing via a plurality of interface indicators a plurality of component interfaces between electronic components represented by parts of the graphical model.

45. The medium of claim 38, wherein one of the first electronic component and the second electronic component comprises one of a processor, a field programmable gate array, an application specific integrated circuit, and a programmable logic device.

46. The medium of claim 38, wherein one of a first portion of code suitable for implementation on the first component, and a second portion of code suitable for implementation on the second component, is automatically generated from the block diagram model to provide an implementation of the component interface between the first electronic component and the second electronic component represented by the interface indicator.

47. The medium of claim 38, comprising configuring, in the modeling environment, a type of the component interface associated with the interface indicator, the type obtained from one or more of the following:
  one or more component interface types listed with the modeling environment,
  a topology of one or more computational hardware devices listed with the modeling environment,
  a library of one or more component interfaces readable by the modeling environment, and
  a reference configured in the modeling environment to component interface code provided by a user.

48. A device readable medium holding device readable instructions for a method of generating code from a graphical model for an interface between electronic components in a computational hardware device, the method comprising:
  receiving a graphical model having an interface indicator representing a component interface between a first electronic component and a second electronic component of a computational hardware device, a first part of the graphical model represents at least a portion of a design to be implemented in the first electronic component, and a second part of the graphical model represents at least a portion of a design to be implemented in the second electronic component, the first electronic component and the second electronic component separated by a first interface boundary representing the component interface between electronic components;
  determining the component interface type represented by the interface indicator, wherein the interface indicator can represent at least one component interface type of one or more component interface types;
  generating a first set of code for the first part of the graphical model that includes a first portion of the component interface to execute on the first electronic component, and
  generating a second set of code for the second part of the graphical model including a second portion of the component interface to execute on the second electronic component.

49. The medium of claim 48, wherein the first set of code further comprises code representative of a portion of functionality represented by the first part of the graphical model, and the second set of code further comprises code representative of a portion of functionality represented by the second part of the graphical model.

50. The medium of claim 48, wherein one of the first portion of code and the second portion of code comprises code determined by a type of component interface associated with the interface indicator of the graphical model.

51. The medium of claim 48, comprising generating code for a plurality of component interfaces represented by a plurality of interface indicators in the graphical model.

52. The medium of claim 48, wherein one of the first electronic component and the second electronic component comprises one of a processor, a field programmable gate array, an application specific integrated circuit, and a programmable logic device.

53. The medium of claim 48, comprising:
  invoking a building of one of the first set of code and the second set of code into a program to execute on one of the first electronic component and the second electronic component.

54. The medium of claim 48, comprising:
  generating a portion of the code for the component interface between the first electronic component and the second electronic component by linking in a device driver.

55. A device readable medium holding device readable instructions for a method for representing in a graphical model a component interface between electronic components of a computational hardware device and generating code for the component interface from the graphical model, the method comprising:
  providing, in a modeling environment, a graphical model representing a design for implementation in a first computational hardware device having at least a first electronic component and a second electronic component, a first part of the graphical model represents a portion of the design for implementation in the first electronic component, and a second part of the graphical model represents a portion of the design for implementation in the second electronic component, the first electronic component and the second electronic component separated by a first interface boundary representing the component interface between electronic components;
  graphically representing via an interface indicator between a first part and a second part of the graphical model a component interface for implementation between the first electronic component associated with the first part and the second electronic component associated with the second part; and
  generating code for the first component interface between the first electronic component and the second electronic component.

56. The medium of claim 55, wherein generating code comprises generating one of a first set of code for the first part of the graphical model comprising a first portion of the component interface to execute on the first component, and a second set of code for the second part of the graphical model comprising a second portion of the component interface to execute on the second component.

57. The medium of claim 55, comprising identifying a component interface type from one or more component interface types to associate with the interface indicator without changing the graphical representation of one of the graphical model and the interface indicator.

58. The medium of claim 55, comprising associating a component interface type from one or more component interface types with the interface indicator while maintaining the graphical representation of one of the graphical model and the interface indicator.

59. The medium of claim 55, comprising associating the interface indicator with one component interface type of one or more component interfaces between electronic components different than one of the first electronic component and the second electronic component, while maintaining the graphical representation of the interface indicator.

60. The medium of claim 55, wherein the design of the graphical model can be implemented on a second computational hardware device without changing the graphical representation of one of the graphical model and the interface indicator, the second computational hardware device having one or more different component interfaces than the first computational hardware device.

61. The medium of claim 55, wherein the design of the graphical model can be implemented in a second computational hardware device without changing the graphical representation of one of the graphical model and the interface indicator, the second computational hardware device having one of the same electronic components as the first computational hardware device and electronic components different than the first computational hardware device.

62. The medium of claim 55, comprising generating code for a plurality of component interfaces represented by a plurality of interface indicators in the graphical model.

63. The medium of claim 62, wherein one of the first component and the second component comprises one of a processor, a field programmable gate array, an application specific integrated circuit, and a programmable logic device.

64. The medium of claim 55, comprising configuring, in the modeling environment, a type of the first component interface associated with the first boundary, the type obtained from one or more of the following:
   one or more component interface types listed with the modeling environment,
   a topology of one or more computational hardware devices listed with the modeling environment,
   a library of one or more component interfaces readable by the modeling environment, and
   a reference configured in the modeling environment to component interface code provided by a user.

65. The medium of claim 55, comprising:
   invoking a building of one of the first set of code and the second set of code into a program to execute on one of the first electronic component and the second electronic component.

66. The medium of claim 55, comprising:
   generating a portion of the code of the first component interface between the first electronic component and the second electronic component by linking in a device driver.

67. A distribution system for transmitting device readable instructions for a method of representing in a graphical model an interface between electronic components of a computational hardware device, the method comprising:
   providing, in a modeling environment, a graphical model representing a design for implementation in a first computational hardware device having at least a first electronic component and a second electronic component, the first electronic component and the second electronic component separated by a first interface boundary representing the interface between electronic components;
   identifying an interface point between a first part of the graphical model representing a portion of the design associated with the first electronic component and a second part of the graphical model representing a portion of the design associated with a second electronic component; and
   graphically representing via an interface indicator at the interface point in the graphical model a component interface between the first electronic component and the second electronic component, wherein the interface indicator can represent at least one type of component interface of one or more component interface types.

68. A distribution system for transmitting readable instructions for a method of generating code from a graphical model for an interface between electronic components in a computational hardware device, the method comprising:
   receiving a graphical model having an interface indicator representing a component interface between a first electronic component and a second electronic component of a computational hardware device, a first part of the graphical model represents at least a portion of a design to be implemented in the first electronic component, and a second part of the graphical model represents at least a portion of a design to be implemented in the second electronic component, the first electronic component and the second electronic component separated by a first interface boundary representing the interface between electronic components;
   determining the component interface type represented by the interface indicator, wherein the interface indicator can represent at least one component interface type of one or more component interface types;
   generating a first set of code for the first part of the graphical model that includes a first portion of the component interface to execute on the first electronic component, and
   generating a second set of code for the second part of the graphical model including a second portion of the component interface to execute on the second electronic component.

* * * * *